Aug. 24, 1954 W. M. McMILLAN 2,687,253

PHOTOCELL TESTING CIRCUIT

Filed Oct. 31, 1952 2 Sheets-Sheet 1

INVENTOR
WILMUR M. McMILLAN

BY
Charles E. McTiernan
ATTORNEY

PHOTOCELL TESTING CIRCUIT

Filed Oct. 31, 1952

INVENTOR
WILMUR M. Mc MILLAN
BY Charles E. McTiernan
ATTORNEY

Patented Aug. 24, 1954 2,687,253

UNITED STATES PATENT OFFICE 2,687,253

PHOTOCELL TESTING CIRCUIT

Wilmur M. McMillan, Wappingers Falls, N. Y., assignor to International Business Machines Corporation, New York, N. Y., a corporation of New York Application October 31, 1952, Serial No. 317,903

5 Claims. (Cl. 235—61.11)

Figures 1, 2A, 2B, 2C:
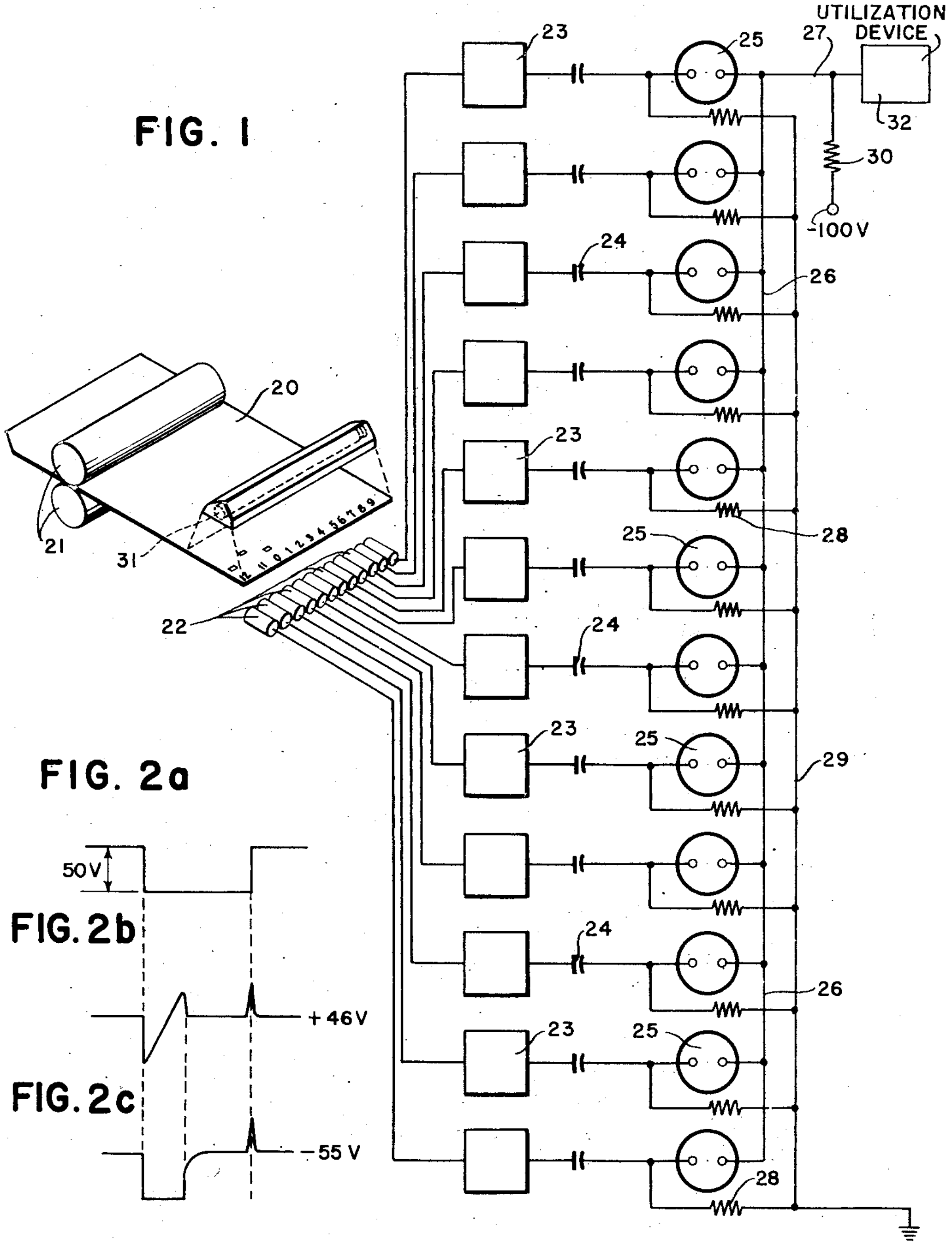

The present invention relates to circuitry for checking the operability of photoelectric devices as employed in a record card scanning system.

The main object of the invention is to provide a circuit arrangement for testing the operability of photoelectric scanning devices prior to the scanning of a data bearing record card.

Another object of the invention is to provide means for repeatedly checking the condition of a plurality of light responsive devices before said devices scan or analyze successively fed data bearing cards.

A further object of the invention is to provide means for preventing the further feeding of record cards whenever a plurality of light responsive devices, upon the detection of the leading edge of a record card, each fail to emit an impulse of predetermined polarity.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is an illustrative circuit of the main embodiment of the invention.

Fig. 2*a*, Fig. 2*b* and Fig. 2*c* are diagrammatic representations of the successive voltage changes occurring in the circuit of Fig. 1.

Figure 3:
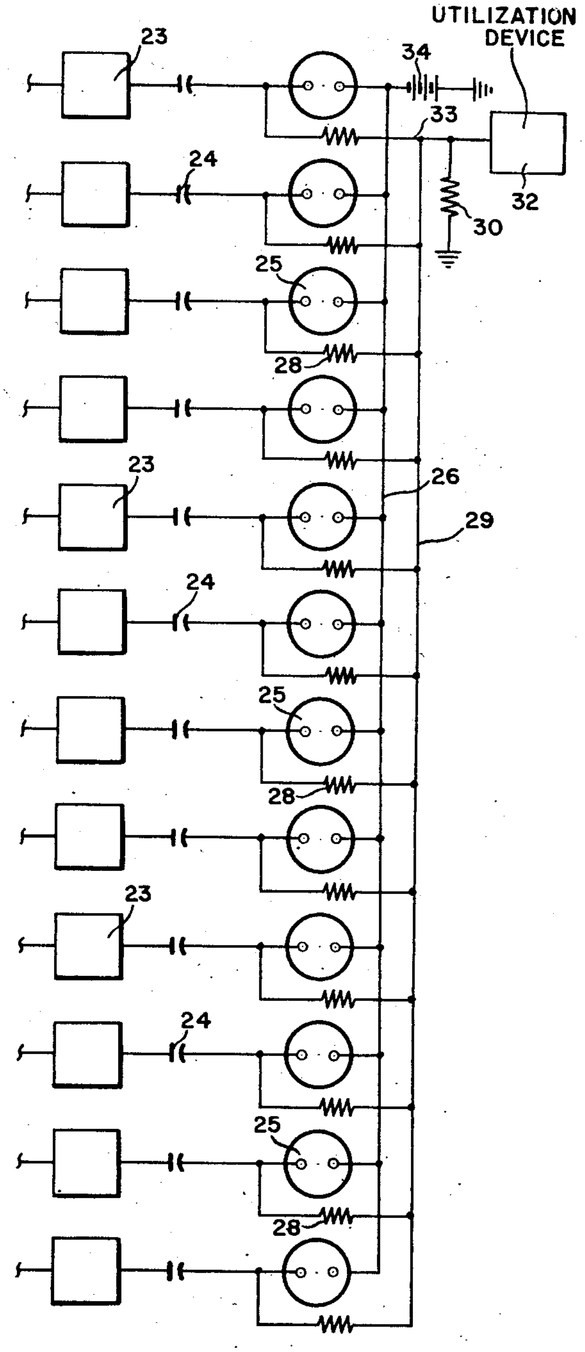

Fig. 3 is a circuit diagram of a modification of the circuit of Fig. 1.

Figure 4A:
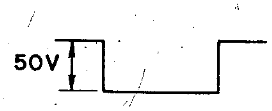
Figure 4B:
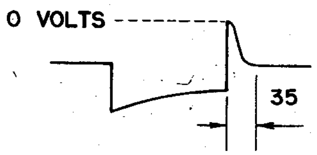

Fig. 4*a* and Fig. 4*b* are diagrammatic representations of the successive voltage changes occurring in the circuit of Fig. 3.

Referring to the drawings, there is diagrammatically shown a data bearing record card 20 which has been fed into the feed rollers 21 from a card hopper not shown. The feed rollers 21, in turn, advance the cards in a well known manner past the scanning station which comprises twelve photoelectric or light responsive devices 22, there being one for each of the index positions contained in the well known IBM record card.

The area of the record card 20 is subdivided into vertical columns by index point positions. There are eighty columns in a card and twelve index point positions in each column. The index point positions are indicated at the right-hand side of the card in Fig. 1. Data may be represented in the card columns through the punching of the appropriate index points, singly or in combination, pursuant to well known coding arrangements.

The twelve photocells 22, there being one for each index position in the cards, are to be used in analyzing the data contained in the card much in the manner as that described in the copending patent applications Serial No. 153,197 of H. P. Luhn, and Serial No. 137,755, now Patent No. 2,618,386, of Jacques Samain. For a more detailed explanation of the manner in which these twelve photocells function in the scanning of a record card, reference should be made to either of the aforementioned applications. It should be understood at this time that the applicant's device would supplement the necessary structure and circuit arrangements of the Luhn and Samain inventions.

Each of the photocells or light responsive devices 22 are connected to an associated amplifier and shaping circuit 23. Each of the circuits 23 are connected through the associated capacitor 24 to one side of the corresponding gas discharge lamp or voltage responsive device, such as a neon lamp, 25. The other side of each of the neon glow lamps 25 is coupled to the conductor 26 which is connected to the output line 27. A resistor 28 is connected between the junction of each capacitor 24 and its associated lamp 25 and the grounded conductor 29. A non-linear thyrite load resistor 30 from which an output pulse is taken is connected between the conductor 27 and a negative source of potential of −100 volts.

To obviate a detailed explanation of the well known card feeding mechanism, it will be assumed, for the purpose of the present invention, that the record card 20 is initially brought to a position where the leading edge of the card is about to pass over the photoelectric devices 22.

Now when the leading edge of the record card 20 passes over the light responsive devices 22, the devices 22 will be cut off from the source of light 31. The blocking off of the photocells 22 from the light source 31 will cause an impulse of predetermined polarity to be applied to each of the shaping and amplifier circuits 23 resulting in the production thereby of a negative pulse such as that shown in Fig. 2*a*.

The leading edge of this negative 50 volt pulse, upon being applied from the circuit 23 to the normally on gas discharge lamp 25, will instantaneously cause a sharp decrease in the voltage drop across the neon glow lamp 25, such as shown in Fig. 2*b*, causing it to be extinguished. This sharp change in the voltage drop across the lamp 25 is attributed to the fact that the voltage across the associated capacitor 22 cannot instantaneously change. Therefore, the high charging current causes a large voltage drop across the corresponding series resistor 28 which decreases the voltage across the associated neon lamp 25 below its sustaining voltage.

The capacitor 24 will continue to charge until the decreasing charging current through the associated resistor 28 causes the voltage drop across resistor 28 to decrease to a value such that the voltage across the neon lamp 25 has risen to the firing potential thereof. At this instant, the glow lamp 25 will again fire and the voltage across it will drop to the normal operating voltage of approximately 46 volts.

As each new lamp 25 is extinguished, less current will flow through the thyrite resistor 30 causing the voltage drop across it to decrease. Thus, with the twelve neon lamps 25 extinguished, the current through the resistor 30 becomes zero resulting in the production of a negative output pulse on the output line 27, such as shown by the voltage waveform of Fig. 2*c*. It is this negative output pulse which could be applied to condition a utilization device 32 for the continued feeding of record cards past the photocells. The lack of this negative output pulse would cause the utilization device to operate in a well known manner to stop the feeding of the record cards.

It is to be understood that if one or more of the photocells 22 are inoperative or defective at the time the leading edge of the record passes over same, the associated neon lamp 25 will not be extinguished. As a result and due to the use of the thyrite resistor 30, the magnitude of the negative output pulse on conductor 27 will be insufficient to enable the feeding of the record cards to be continued.

Inasmuch as it is desired that a large increase in the magnitude of the negative output pulse occur when the last lamp 25 is extinguished, use is made of a non-linear resistive element, such as the thyrite resistor 30. The characteristic of the resistor 30 is such that as the current flowing through the resistor 30 increases, the resistance of the resistor 30 decreases. Thus when the current from as many as eleven of the twelve lamps 25 is flowing through the thyrite resistor 30, the change in voltage across it due to one of the eleven lamps 25 being extinguished is not as great as the change caused by the twelfth lamp 25 going out when only the current of the twelfth lamp had been flowing through the resistor 30. It is pointed out that the use of a linear resistor in place of the non-linear resistor 30 would not produce the necessary discrimination between the eleventh and twelfth lamps 25 being extinguished. This is so because the change due to one lamp 25 being extinguished would be equal to the current drawn by a lamp times the resistance. Thus, in the case of a linear resistor, it would be difficult to determine the difference between only two lamps glowing, only one lamp glowing and all of the lamps being extinguished.

Referring to Fig. 2*c*, it is noted that a small positive spike occurs on the output line 27 as the output pulse (Fig. 2*a*) of the amplifier 23 proceeds in a positive direction. This is due to the fact that the associated capacitor 24 is charging in a direction such that a larger voltage occurs across the corresponding neon lamp 25. This results in a large instantaneous current through the thyrite resistor 30 causing an additional instantaneous voltage drop across it. However, this positive pulse will be ineffective inasmuch as the utilization device connected to the output line 27 is sensitive only to negative pulses.

A modification of the main embodiment of the applicant's invention is shown in Fig. 3. In this embodiment, elements similar to like elements in the embodiment of Fig. 1 bear identical reference numerals.

In this embodiment shown in Fig. 3, a positive output pulse will be produced for application to the utilization device 32, which device upon receiving such a pulse will enable the feeding of record cards to be continued.

In this embodiment of Fig. 3, conductor 26 commonly connected to all the neon glow lamps 25 is connected to the negative terminal of a source of potential 34 of —100 volts while the associated series resistor 28, commonly coupled to the conductor 29, is connected to the output line 33.

Now when the leading edge of the record card passes over the photocells 22, a negative output pulse of the magnitude such as shown in Fig. 4*a* will be produced by each of the associated amplifying circuits 23. As previously explained, the application of this negative pulse will cause the voltage applied to each neon lamp 25 to drop below the extinguishing potential so that the neon lamp will lose its glow. As a result of all the lamps 25 being extinguished, the source of potential 34 is isolated from the output conductor 33. It is pointed out that when a lamp 25 is not extinguished, current will flow from ground through the thyrite resistor 30, output conductor 33, associated resistor 28, neon lamp 25 and then to the source of potential 34.

As a result of the isolation of the output conductor 33 from the source of potential 34, the conductor 33 will follow the voltage pattern of the capacitor 24. As long as the capacitor 24 is charging after the lamps 25 are extinguished, the output conductor 33 will follow the charging curve as shown in Fig. 4*b*. As soon as the negative output pulse of the amplifying circuit 23 terminates, the neon lamps 25 will try to fire once again. However, due to the characteristics of a neon lamp and the time constant of the circuit, a period of time will elapse before the glow is re-established. It is during this time duration 35 (Fig. 4*b*) that the useable positive pulse which is applied to the utilization device 32 appears on conductor 33.

The lack of a positive pulse being applied to the utilization device 32 at the time the leading edge of the card passes over the photocells 22 will cause further feeding of the cards to be halted in a well known manner.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A light responsive device checking circuit comprising a plurality of photoelectric means adapted to successively scan data bearing record cards, a source of light, a plurality of series circuits comprising a resistance element and an associated gas discharge lamp, there being one of said circuits for each said photoelectric means, means for applying an impulse of predetermined polarity to each said series circuit at the time the leading edge of said cards pass over said photoelectric means causing the corresponding one of said gas lamps to be extinguished, and means including a non-linear resistance commonly coupled to said discharge lamp of each said series circuit for producing an output pulse of predetermined polarity when said lamp of all said series circuits is extinguished.

2. An electrical circuit arrangement comprising a source of light, a plurality of photoelectric scanning devices for analyzing data bearing record cards, an associated circuit including a resistor connection in series with a corresponding gas discharge lamp for each of said devices, said lamp adapted to be extinguished at the time the corresponding one of said devices is blocked off from said source of light by the leading edge of said cards, a non-linear resistance element commonly coupled to each said gas lamp of said devices, said element adapted to produce an output pulse of a predetermined polarity only when all of said devices are blocked off from said source of light.

3. Apparatus of the class described comprising a source of light, a plurality of light responsive devices normally exposed to said light, a plurality of normally ionized gas discharge lamps, there being one for each of said devices and correspondingly coupled thereto, a non-linear impedance element, resistor means for commonly coupling each said lamps to said impedance element, and means for blocking off said light source from said devices causing said lamps to be deionized, said element developing a pulse of a predetermined polarity only when all of said lamps are responsive upon said devices being blocked off from said light source.

4. A light responsive checking device for testing the operativeness of a plurality of light responsive elements prior to the scanning of perforated data in a record card by said elements comprising a source of light, a plurality of normally lit gas discharge lamps, there being one for each of said elements and correspondingly coupled thereto, a non-linear resistance device, means including individual resistance means for each of said lamps for commonly coupling said lamps to said non-linear device, and means including the leading edge of successively fed record cards for blocking off said elements from said source of light, the operative ones of said elements upon being blocked off from said source of light causing the corresponding one of said lamps to be extinguished, said non-linear device producing an impulse of predetermined polarity only when all of said lamps are extinguished.

5. A circuit for detecting the failure of light responsive devices as used in a record card scanning system comprising a source of light, a plurality of photoelectric devices adapted to scan data contained in record cards successively fed past said devices, a non-linear impedance element, means including an equal number of normally conductive gas discharge lamps each coupled to the corresponding one of said devices for commonly coupling said lamps to said impedance element, means including the leading edge of each said successively fed record card for blocking off said devices from said light source prior to the scanning of the data therein, the corresponding one of said lamps being made nonconductive when the associated one of said devices undergoes a change upon being blocked off from said light source, said non-linear element producing useful output pulse of predetermined polarity only when all of said lamps are made non-conductive.

References Cited in the file of this patent

UNITED STATES PATENTS

| Number | Name | Date |
|---|---|---|
| 2,024,275 | Clark | Dec. 17, 1935 |